(12) United States Patent
Swires

(10) Patent No.: US 8,060,861 B2
(45) Date of Patent: Nov. 15, 2011

(54) TOOL TO GENERATE ACTIVE PAGE INTERFACE INSTRUCTIONS

(76) Inventor: Charles Swires, West Yorkshire (GB)

( * ) Notice: Subject to any disclaimer, the term of this patent is extended or adjusted under 35 U.S.C. 154(b) by 352 days.

(21) Appl. No.: 12/510,080

(22) Filed: Jul. 27, 2009

(65) Prior Publication Data

US 2011/0023015 A1    Jan. 27, 2011

(51) Int. Cl.
 *G06F 9/44* (2006.01)
(52) U.S. Cl. ....................................................... 717/115
(58) Field of Classification Search ................... 717/115
 See application file for complete search history.

(56) References Cited

U.S. PATENT DOCUMENTS

| | | | |
|---|---|---|---|
| 7,403,934 | B2 | 7/2008 | Polizzi |
| 2003/0105620 | A1* | 6/2003 | Bowen ............................. 703/22 |
| 2004/0139480 | A1* | 7/2004 | Delpuch et al. ............... 725/135 |
| 2005/0251809 | A1* | 11/2005 | Gunduc et al. ................ 719/310 |
| 2006/0230319 | A1 | 10/2006 | Ryali et al. |
| 2008/0033977 | A1 | 2/2008 | Polizzi |
| 2008/0196004 | A1* | 8/2008 | Choi et al. .................... 717/107 |
| 2008/0313610 | A1 | 12/2008 | Ramsey et al. |
| 2009/0089797 | A1 | 4/2009 | Kukreja et al. |
| 2009/0119586 | A1 | 5/2009 | Weng et al. |

OTHER PUBLICATIONS

Mark McLaren, "qnamespace.h name collision", Apr. 2002, Qt-interest Archive.*
www.Tenouk.com, "Module 11 Type Specifiers, struct, typedef, enum, union", Sep. 21, 2005.*

* cited by examiner

*Primary Examiner* — Philip Wang
(74) *Attorney, Agent, or Firm* — Lowe Graham Jones PLLC

(57) ABSTRACT

A system and method for generating a script conforming with the interactive television standard for embedment in an entertainment device includes retrieving a header file containing definitions of functions present in the interactive television standard. A code file includes a string that does not conform to the interactive television standard for code. The string is broken into substrings based on the presence of the ";" character. In substrings with a "typedef" keyword, a data type is selected based upon occurring immediately succeeding the "typedef" keyword up to the ";" character and creating variables with values representative of the data type. Automatically selecting from a plurality of strings in the header, a suitable string in accord with the variables creates resulting substring in a form acceptable according to the interactive television standard. The resulting code is stored in a memory storage for execution by the entertainment device.

17 Claims, 3 Drawing Sheets

TOOL TO GENERATE ACTIVE PAGE INTERFACE INSTRUCTIONS

BACKGROUND

An application programming interface (API) is a set of routines, data structures, object classes or protocols provided by libraries or operating system services in order to support the building of applications. An API may be:

Language-dependent; that is, available only in a particular programming language, using the particular syntax and elements of the programming language to make the API convenient to use in this particular context.

Language-independent; that is, written in a way that means it can be called from several programming languages (typically an assembly or C interface). This is a desired feature for a service-style API that is not bound to a particular process or system and is available as a remote procedure call.

The API itself is largely abstract in that it specifies an interface and controls the behavior of the objects specified in that interface. The software that provides the functionality described by an API is said to be an implementation of the API. An API is typically defined in terms of the programming language used to build an application. The API acronym may sometimes be used as a reference not only to the full interface but also to a single function or even a set of multiple APIs provided by an organization. Thus the scope is usually determined by the person or document that communicates the information.

For consumer electronics devices APIs determine much of the interaction between the user and the device. A consortium of cable providers have standardized a middleware syntax of programming that provides a common platform that enables retail devices to receive—in one standard way—the wide variety of video-on-demand services, interactive program guides, and other interactive features that cable systems currently deliver through the many divergent network technologies, and to deliver cable services through a variety of retail devices. The advantage to a nationwide common platform is the ability to develop programs in a "write once, run anywhere" distribution of various interactive applications for distribution in a homogenous environment (e.g., voting, polling, gaming, and interactive advertising). Among the interactive television standards that exist including those of the Cable Television Laboratory, Inc. (CableLabs™) consortium of cable television operating companies, are Tru2way™, Europacable™, EBIF™ (Enhanced TV Binary Interchange Format), OpenCable™ Application Platform, Globally Executable MHP (GEM™) standard, and ANSI. Because of the standardization, the middleware technology may be built into televisions, television receivers, and other devices (such as a DVR or computer monitor). Because the middleware is based on C technology, programmers are relatively familiar with the general nature of programming within the environment and can rapidly learn the regimen of programming to the new standard.

Nearly every C package has header files that define utility macros and types like int32, boolean, true, false, and so on. If a programmer tries to use several packages within an application that do not use identical definitions for these common items, that programmer may spend quite a while in "header file hell" before compiling an empty program that includes all the header files. Writing a C application that uses a dozen different packages from different authors almost certainly involves some of this type of pain. On the other hand, it is quite common for a Java application to use a dozen or more different packages without any such pain. If packages were to use pseudotypes in their APIs, those packages would be reinventing a problem that should remain only a painful memory.

As an example, say two different packages each define StringList using the pseudo-typedef antipattern, and each defines utility methods to operate on a StringList. The fact that both packages have defined the same identifier is already a minor source of inconvenience; client programs must choose one definition to import and use the fully qualified name for the other. But the bigger problem is that now clients of these packages cannot create an object that can be passed to both sortList and reverseList because the two different StringList types are distinct types and are not compatible with each other. Clients now must choose between using one package or the other, or they have to do a lot of work to convert between the different kinds of StringList. Standardization is necessary to avoid the significant impediment to using the package in all but the most limited contexts.

The disadvantage to such standardization, is that computer scripts so formed, must rigidly adhere to a standardized form with the exact same naming conventions for operations, subroutines, constants, and variables. Interactive television standards include extensive use of very efficient conventions for designating structures and variables. Often, the conditions the variables express are generally designated by numbers rather than more verbose expressions. The use of numbers makes the code more arcane and less accessible by human programmers.

Previously, to avoid writing a complete program or a complete script, a programmer would start a project by either reusing some previous code that was similar to the current project request or by going to a repository of standard templates. The programmer then proceeds with the time consuming task of replacing mirrored code with new variables. A single project may take a programmer hours or even days to complete, depending on how much rework must be done on the acquired code.

Because of the expression of processes in terms of numbers, the coded scripts are inherently less understandable than more verbose names for the same variables. When drafting code in this fashion, coding programmers lose the most important abilities to check on the status of code as it is being formed, and check for consistent use of named protocols and procedures. Previously, a programmer might start a project by either reusing some previous code that was similar to the current project request or by going to a repository of standard templates. The programmer then proceeds with the time consuming task of replacing mirrored code with new variables. A single project may take a programmer hours or even days to complete, depending on how much rework must be done on the acquired code. Even at that, when crafting interfaces or APIs the code tends to be very redundant and, as such, readily susceptible to erroneous substitution. Often times, as well, the great efficiency of the universal standard is then compromised by the inclusion of irrelevant script carried with the templates and configured for different purposes than the API under study.

A second way to draft new script entails the use of verbose coding standards not consistent with a universal standard and then porting over to the universal standard after testing in verbose form. Doing so, however, is tedious and fraught with the possibility of introducing latent errors that will be nearly impossible to track down in the code in interactive television services standard form.

The disadvantages associated with current script generating techniques have manifest the need for a system that allows the proper transposition of code from any interactive television standard to verbose code and back again to allow human programmers to program with confidence.

SUMMARY

A system and method for generating a script conforming with an interactive television standard for embedment in an entertainment device includes retrieving a header file containing definitions of functions present in an interactive television standard. A code file includes a string that does not conform to any interactive television standard for code. The string is broken into substrings based on the presence of the ";" character. In substrings with a "typedef" keyword, a data type is selected based upon occurring immediately succeeding the "typedef" keyword up to the ";" character and creating variables with values representative of the data type. Automatically selecting from a plurality of strings in the header, a suitable string in accord with the variables creates resulting substring in a form acceptable according to an interactive television standard. The resulting code is stored in a memory storage for execution by the entertainment device.

BRIEF DESCRIPTION OF THE DRAWINGS

The preferred and alternative embodiments are described in detail below with reference to the following drawings.

DETAILED DESCRIPTION OF THE PREFERRED EMBODIMENT

Figure 1:
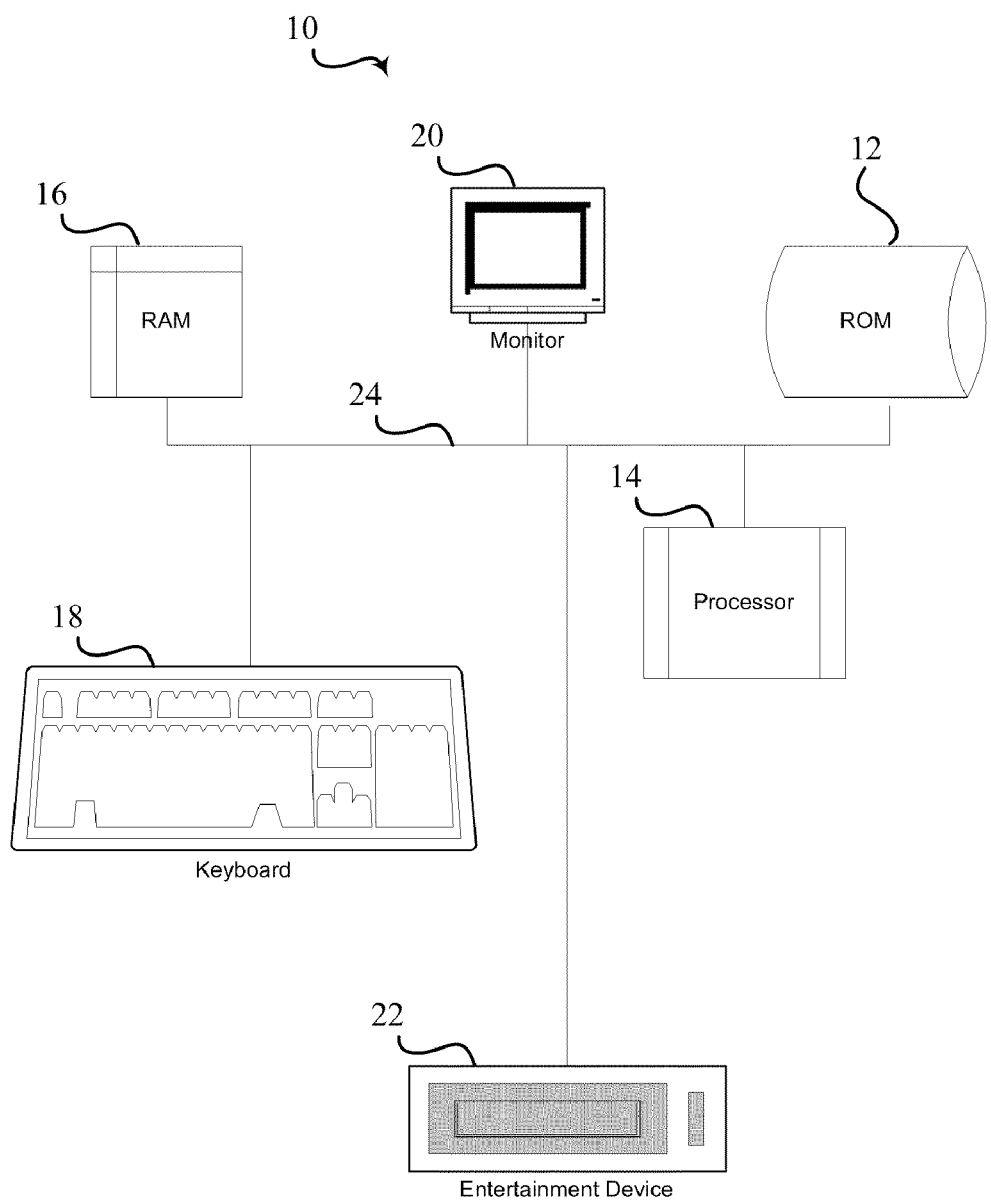
FIG. 1 is a block diagram of a system to generate and embed suitable scripts in an entertainment device.

Referring to FIG. 1, a system 10 for transposing instances of C script into script conforming with an interactive television specification, and embedding the script into entertainment devices. The system 10 includes a nonvolatile or Read Only Memory (ROM) 12 which characteristically may be any one or several of a magnetic hard drive, a flash drive, optical discs, forms of magnetic storage like hard disks, and other types slower than Random Access Memory, but of a more permanent nature. A hard drive having data resident upon it is illustrated as ROM 12 in accordance with one embodiment. The system 10 also includes random-access memory (usually known by its acronym, RAM) 16, which is a form of computer data storage. Conventionally, it takes the form of integrated circuits that allow stored data to be accessed in any order (i.e., at random). The word random thus refers to the fact that any piece of data can be returned in a constant time, regardless of its physical location and whether or not it is related to the previous piece of data. By contrast, the previously described nonvolatile storage devices such as tapes, magnetic discs and optical discs rely on the physical movement of the recording medium or a reading head. In these devices, the movement takes longer than data transfer, and the retrieval time varies based on the physical location of the next item.

The system 10 includes a processor for movement and modification of information from the ROM 12 to be temporarily resident in the RAM 16 during processing and ultimately to be embedded in an entertainment device 22 in its own read only memory (not shown). A user interacts with the system 10 by means of an interface most commonly consisting of a keyboard 18 (and optionally a mouse or other pointing device (not shown)) and a monitor 20 which displays indicia of the activity of a processor 14. The intercommunication of these separate elements is achieved through the use of a bus 24.

In operation, the system 10 will generally have resident on the ROM 12 a series of instructions to the processor 14 that include the finding or generation of a header file and consequent generation of a product code file based upon the header file and a resource code file. For purposes of this explanation, the resource code file is a file that is in a first instance (either compatible to the interactive television standard instance or, alternatively, in a more verbose code instance awaiting conversion to the interactive television standard.). While the described purpose of the system 10 is to convert readily from the interactive television standard instance to a more readily understood verbose coding instance and back again, a person having ordinary skill in the art will readily appreciate that the system 10 is also suitably configured to allow review and modification of coding within either instance in order to achieve the purpose of more efficiently generating instances of coding.

The resource code file is stored within the ROM 12. The retrieval of script segments from the resource code file, allows the processor 14 to generate error-free scripts for an infinite number of "structdef" and "enum" keyword occurrences. By incorporating and manipulating dictionary information from the resource code file, the processor 14 also allows a user to generate new script segments using the resource files as the source of predefined variables, such as the ones used in accord with the interactive television standard. The resource files may also implicate other script segments necessary to define an interactive television variables, thereby allowing the user to quickly assemble repetitive, complex script logic solely from resource file information.

Figure 2:
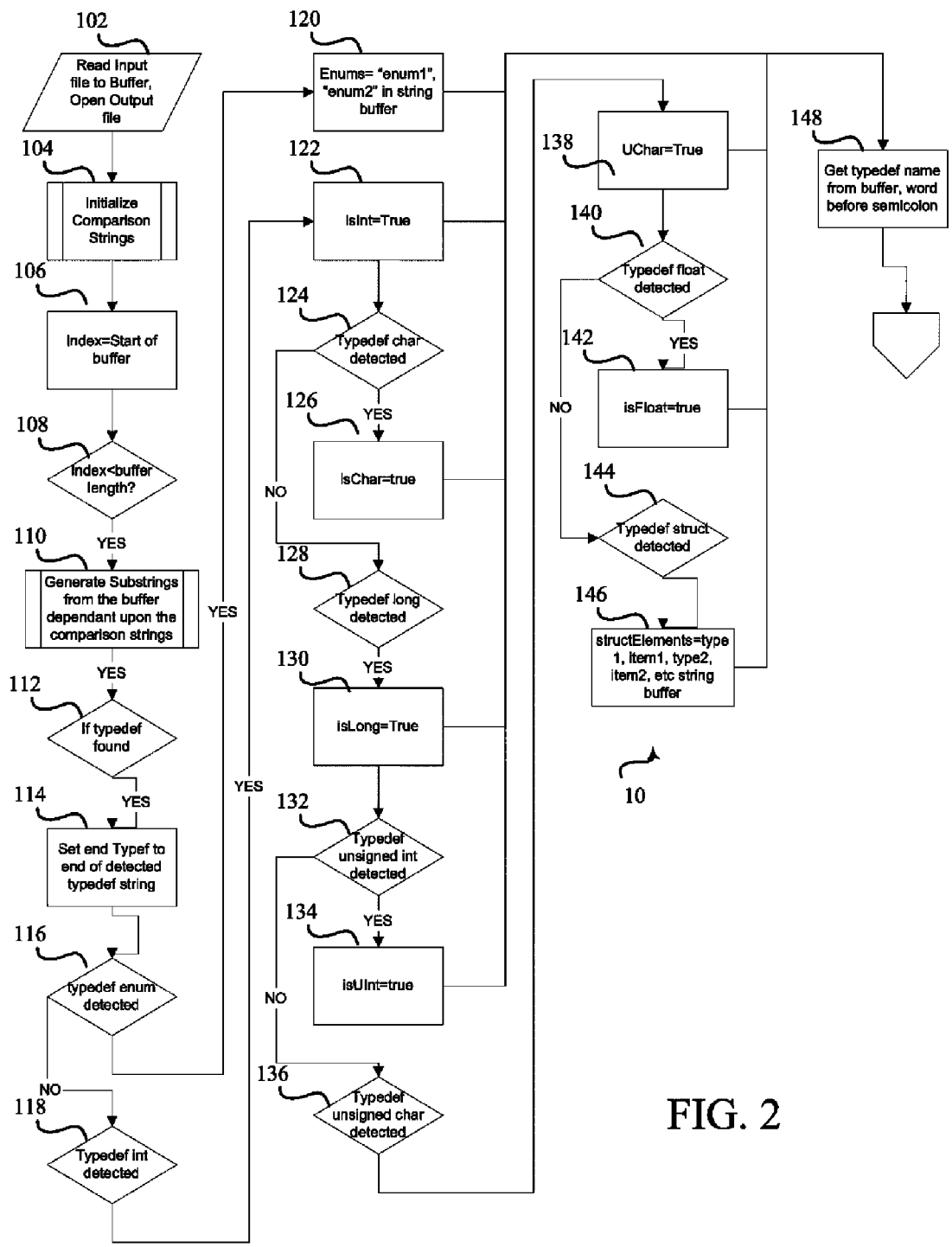
FIG. 2 is a first half of a flow chart for generating script according to an interactive television standard.
Figure 3:
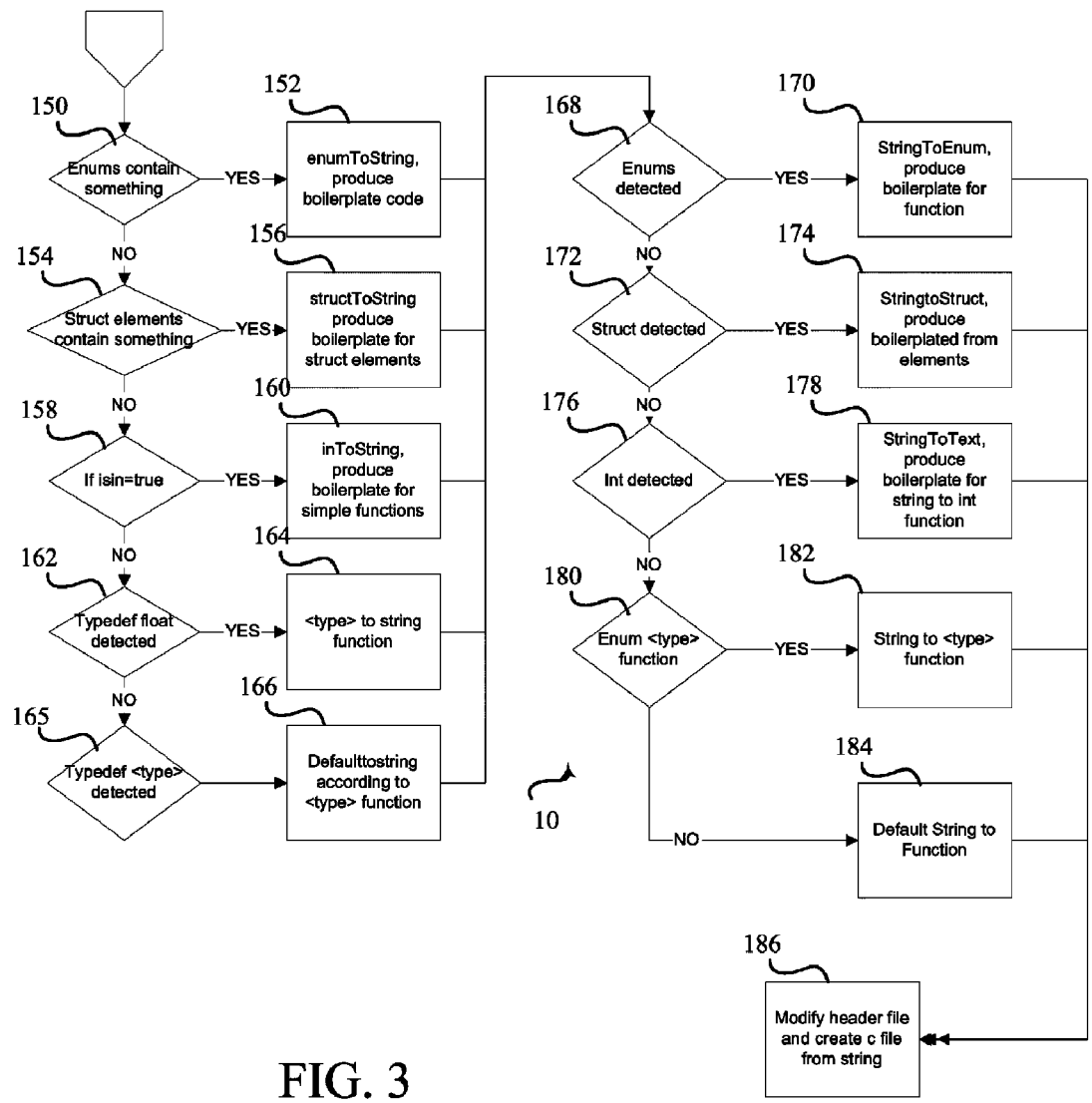
FIG. 3 is a second half of a flow chart for generating script according to an interactive television standard.

Referring to FIG. 2, a logic flow diagram of a method 100 for automating system administration operations is illustrated. Logic starts in operation block 102 where a processor opens both of a header file and a code file to use as an output file. The header file acts as the resource file having within it the various "typedef" expressions in conformance with the interactive television standard as well as the likely verbose expressions.

In operation block 104, a buffer is initiated. The buffer mechanism facilitates construction of a character string for discerning patterns within the string. The buffer provides an input stream with unbounded buffering and backtracking. The amount of buffering is under program control. The stream can backtrack to any position in the buffer.

Characters can be read from the buffer much as they can be read from an input port. The buffer maintains an internal pointer indicating its current position in the input stream. At the operation block 104, the initial character of the string is placed at an address that is designated as the first position. Additionally, the buffer remembers all characters that were previously read, and can look at characters arbitrarily far ahead in the stream. It is this buffering capability that facilitates complex matching and backtracking.

The system uses an index variable which is a non-negative integer specifying a character from a string of characters to be returned. If the index is zero, the process returns the first character in the string; if it is one, the process returns the character after that, and so on. At an operational block 108, the processor checks to see if the string, expressed in terms of the index integer specifies a position after the last character in buffer, i.e. the index exceeds the length of the buffer, and so long as it does do so, the buffer is deemed to have an intact string of characters. The query as to length leaves the internal pointer unchanged.

Given the grammar of C, it is easy to break the string of characters in the buffer into substrings that reflect commands in the programming language. Semicolons are required after every statement (such as in Perl, Java, and the C family). In this manner, the buffer is demarcated into substrings representing individual commands.

At an operational block 112, the substrings are examined for the presence of the "typedef" keyword. A "typedef" declaration introduces a name that, within its scope, becomes a synonym for the type given by the type-declaration portion of the declaration. For use of the same type of data for many declarations, a programmer can customize its name. In C, the "typedef" keyword allows a programmer to create an alias for a data type. The use of the "typedef" keyword is significant in allowing the change from an interactive television standard variable set to one that is far more understandable to programmers and back to an interactive television standard.

The use of "typedef" provides a level of abstraction away from the actual types being used, allowing the programmer to focus more on the concept of just what a variable should mean. This makes it easier to write clean code, but it also makes it far easier to modify the code.

This method of using "typedef" keywords can also be a convenience; C template types can be exceptionally long and annoying to type, especially when making heavy use of the STL. Use if "typedef" keywords allows the programmer to easily create abbreviations for these long type names, with the added bonus that they make it much easier to make changes throughout the code if the programmer wants to change the templated type.

For example, where the typedef is used in the following script, it is used to create a string in the string buffer:

```
typedef struct FRED_tag {
    tTYPE1 item1,
    eTYPE2 item2,
    tLENGTH length,
    tTYPE3 items
} sFRED;
```

Running the script creates pairs of strings generated in the string buffer:
"tTYPE1 item1,eTYPE2 item2,tLENGTH length,tTYPE3 items"

The string buffer is then split into a number of distinct strings, based upon content, to produce the boiler plate for use in the string_to_type functions and the type_to_string functions. The enums can also be used in a similar fashion. Using the following script shows just how to exploit the typedef to reverse the script generation:

```
typedef struct GEORGE_tag {
    FINE,
    GOOD,
    NOT_SO_GOOD,
    BAD
} eGEORGE;
```

Which produces strings in the string buffer:
"FINE", "GOOD", "NOT_SO_GOOD", "BAD"

Judiciously used in such a fashion, the typedef keyword enables the generation of script expressed in boiler plate functions present in the header file. Note eGEORGE and sFRED are the typedef names and are used as a reference in the function names.

The "typedef" keyword can be followed by any C built-in data type, including int, short, signed, unsigned, char, signed char, unsigned char, double, long, or long double. The data type can also be an existing class that either is provided by one of the libraries that ship with the C compiler. For example, it can be the string class. The data type can also be a pointer to a known type. For that reason, at an operational block the remainder of each substring, having a "typedef" key. In examining the remainder of the substring to the right side of the data type, will be the name that will be used to represent the data type or the pointer and will cue and inform the reformation of the script to and from the interactive television standard.

The "enum" keyword is the most common in actually transitioning from a verbose code to the interactive television standard. "enum" is the abbreviation for ENUMERATE, and is used as a keyword to declare and initialize a sequence of integer constants. For example, where a fault code variables are set forth for the values 0-5:

```
typedef enum RETURN_CODES_tag{
    OK,              /**< if everything went as expected. */
    TIMED_OUT,       /**< message took longer than allowed*/
    FAILED,          /**< resource or code failures */
    INVALID_PARAM,   /**< malformed input data or null pointer*/
    TOO_SHORT,       /**< destination array shorter than source*/
    NOT_SUPPORTED    /**< function not supported from
                        implementation*/
} eRETURN_CODES;
```

At an operational block 120, the transition is made from the verbose to the interactive television standard by determining what the variable name is for the type as it is Return_Codes_tag above. Thus, at an operational block 148, where the variable name is extracted from the substring.

In a similar manner, the "typedef int" is the next keyword set sought in the substrings. At an operational block 118, where the "typedef int" string is found, it is used to set an isInt as equal to true, which occurs at an operational block 122. To tell time, the interactive television standard exploits integers:

```
typedef int        tHOUR;
typedef int        tMINUTE;
typedef int        tSECOND;
```

Similarly, then, the processor draws the variable name from the typedef expression at the operational block 148 in order to suitably build out the substitute code from templates stored in the header file.

At an operational block 124, the "typedef char" keyword is exploited to find those character variables as they are used within the code. If present, a flag variable IsChar is set to true to inform the process at an operational block 126. Similarly, again, the processor draws the variable name from the typedef expression at the operational block 148 in order to suitably build out the substitute code from templates stored in the header file.

At an operational block 128, the "typedef long" keywords are used to determine the presence of long expressions, i.e. long: at least 32 bits: at least as wide as long. If present, at an operational block 130, the flag variable is Long is set to true to inform the remainder of the process. Then, the processor draws the variable name from the typedef expression at the operational block 148 in order to suitably build out the substitute code from templates stored in the header file.

At an operational block 132, the "typedef unsigned in" keywords are used to determine the presence of unsigned integers. In the C family, unsigned types (unsigned char, unsigned short, unsigned int, and unsigned long) represent unsigned integers with the same number of bits as their corresponding signed integer. If present, at an operational block 134, the flag variable isUInt is set to true to inform the remainder of the process. Then, the processor draws the variable name from the typedef expression at the operational block 148 in order to suitably build out the substitute code from templates stored in the header file.

At an operational block 136, the "typedef unsigned char" keywords are used to determine the presence of unsigned character strings. If present, at an operational block 138, the flag variable isUInt is set to true to inform the remainder of the process. Then, the processor draws the variable name from the typedef expression at the operational block 148 in order to suitably build out the substitute code from templates stored in the header file.

At an operational block 140, the "typedef float" keywords are used to determine the presence of unsigned character strings. In C there are two types of number: Ints and floats. There are also variants of these types that hold bigger numbers, or only unsigned numbers but they are still ints or floats. In most scripting the discipline of only designating variables as floats when necessary is enforced because floats take up more memory and are generally cause a script to run slower than if ints had been properly used. Also a processor running a script cannot easily compare two floats to see if they are equal as that processor can with ints. If present, at an operational block 142, the flag variable is Float is set to true to inform the remainder of the process. Then, the processor draws the variable name from the typedef expression at the operational block 148 in order to suitably build out the substitute code from templates stored in the header file.

At an operational block 144, the "typedef struct" keywords are used to determine the presence of unsigned character strings. The C programming language allows programmers to define program-specific datatypes through the use of classes. Instances of these datatypes are known as objects and can contain member variables, constants, member functions, and overloaded operators defined by the programmer. Syntactically, classes are extensions of the C struct, which cannot contain functions or overloaded operators. The "struct" keyword defines a structure type or a variable of a structure type. If present, at an operational block 146, a series of structures are selected to represent the structure definitions within the substring and, thus, to inform the remainder of the process. Then, the processor draws the variable name from the typedef expression at the operational block 148 in order to suitably build out the substitute code from templates stored in the header file.

At an operational block 150, each of the flag variables set just before the invocation of the operational block 148 is examined to construct script lines based upon the presence of one or more of the keywords following "typedef" in the substrings. At an operational block 152, the new code is composed in accord with the flag variables found to be true.

At an operational block 154, each of the structural elements that were examined just before the invocation of the operational block 148 is examined to construct script lines based upon the presence of those elements in the substrings. At an operational block 156, the new code is composed in accord with the flag variables found to be true.

Likewise, at an operational block 158, if there are present simple operational keywords, found, at an operational block 160, boilerplate language is drawn from the header file to produce those simple functions for storage in the c file based upon the presence of those simple functions in the substrings.

At an operational block 162, where a float variable has been detected, that float variable is then, at an operational block 164, typed into a command in the resulting code to be stored in the c file at the time of the formation.

Where no float variable has been detected, at an operational block 165, the typedef keyword sequence is examined for any of the several more generic sequences including the keywords: int, char, double, unsigned int, unsigned char, long and unsigned long. These keywords are suitably matched with similar text strings that will allow the script to again type the keywords into the text string to generate suitable script. For the remaining language in the code, default language is provided to complete the code held for storage in the c file, at the operational block 166.

A final series of functions are necessary to port the substrings into scripts. At an operational block 168, the substrings are tested for the presence of an "enum" absent the "typedef" keyword. In C, enum types can be used to set up collections of named integer constants. (The keyword enum is short for "enumerated".) The traditional C way of doing this was something like this:

```
#define SPRING  0
#define SUMMER  1
#define FALL    2
#define WINTER  3
```

To the extent that such are present, they are drawn into the resulting code by triggering the conformation of the code to the interactive television standard at an operational block 172.

Similarly, structures are detected at the operational block 172 and suitably ported over at an operational block 174; integer functions are detected at an operational block 176 and suitably ported at an operational block 178. Strings that are present in the code that have their own significance are detected at an operational block 180 and then ported over to the corresponding function of the interactive television standard at an operational block 182. Again, in a manner similar to that which occurs at the operational blocks 165 and 166, to the extent that known code strings are necessary to conform to the standard, they are supplied at an operational block 184. At a block 186, the transformed code is used to modify the header file and then to create a code or "c" file from the string as now transformed.

From the foregoing, it can be seen that there has been brought to the art a new script generating system 10. It is to be understood that the preceding descriptions of various embodiments are merely illustrative of some of the many specific embodiments that represent applications of the principles of the present description. Numerous and other arrangements would be evident to those skilled in the art without departing from the scope of the description as defined by the following claims. One embodiment has been illustrated and described, as noted above, many changes can be made without departing from the spirit and scope of that description. Accordingly, the scope of the invention is not limited by the disclosure of the preferred embodiment. Instead, the scope of the patent grant should be determined entirely by reference to the claims that follow.

The embodiments of the invention in which an exclusive property or privilege is claimed are defined as follows:

1. A method performed by a processor of a server in operative connection with an entertainment device, the method for generating a script for embedment from the server to the entertainment device, the script conforming with an interactive television standard, the method comprising:
retrieving:
a header file containing definitions of functions present in the interactive television standard, and
a code file including a string that does not conform to the interactive television standard for code;
breaking the string into substrings in accord with the placement of a ";" character;
in substrings with a "typedef" keyword, selecting a data type immediately succeeding the "typedef" keyword up to the ";" character and creating variables with values representative of the data type;
in substrings without the "typedef" keyword but having an "enum" keyword, using the words immediately succeeding the "enum" character up to the ";" character to create a suitable "enum" structure to selectively retrieve suitable script language from the header file;
in substrings without the "typedef" keyword but having a "struct" keyword, using the words immediately succeeding the "struct" character up to the ";" character to create a suitable "struct" structure to selectively retrieve suitable script language from the header file;
for each substring, examine the variables created and based upon the variables, typing substring information from strings stored in the header file by automatically selecting from a plurality of strings in the header a suitable string in accord with the variables created, whereby the resulting substring is form acceptable according the interactive television standard;
store the resulting code in a memory storage for execution by the entertainment device.

2. The method of claim 1, further comprising:
for each substring without the "typedef" keyword and without the "struct" keyword and without the "enum" keyword, and for which there are no variables created, selecting a string from the header file based upon the substring to add to the substring to form an instruction according to the interactive television standard.

3. The method of claim 1, wherein the interactive television standard is CableLabs™.

4. The method of claim 1, wherein the interactive television standard is Tru2way™.

5. The method of claim 1, wherein the interactive television standard is Europacable™.

6. The method of claim 1, wherein the interactive television standard is EBIF™ (Enhanced TV Binary Interchange Format).

7. The method of claim 1, wherein the interactive television standard is OpenCable™.

8. The method of claim 1, wherein the interactive television standard is Globally Executable MHP (GEM™) standard.

9. The method of claim 1, wherein the interactive television standard is ANSI.

10. A script generating and embedment system for constructing programming code for embedment in storage of entertainment devices based upon an interactive television standards for programming script, the system comprising:
a processor in operative connection with memory and further with an entertainment device having a device memory;
instructions on the memory for instructing the processor:
to retrieve each of:
a header file containing definitions of functions present in the interactive television standard, and
a code file including a string that does not conform to the interactive television standard for code;
to break the string into substrings in accord with the placement of a character;
in substrings with a "typedef" keyword, to select a data type immediately succeeding the "typedef" keyword up to the ";" character and creating variables with values representative of the data type;
in substrings without the "typedef" keyword but having an "enum" keyword, to use the words immediately succeeding the "enum" character up to the ";" character to create a suitable "enum" structure to selectively retrieve suitable script language from the header file;
in substrings without the "typedef" keyword but having a "struct" keyword, to use the words immediately succeeding the "struct" character up to the ";" character to create a suitable "struct" structure to selectively retrieve suitable script language from the header file;
for each substring, to examine the variables created and based upon the variables, typing substring information from strings stored in the header file by automatically selecting from a plurality of strings in the header a suitable string in accord with the variables created, whereby the resulting substring is form acceptable according the interactive television standard;
to store the resulting code in a memory storage for execution by the entertainment device.

11. The system of claim 10, wherein the interactive television standard is CableLabs™.

12. The system of claim 10, wherein the interactive television standard is Tru2way™.

13. The system of claim 10, wherein the interactive television standard is Europacable™.

14. The system of claim 10, wherein the interactive television standard is EBIF™ (Enhanced TV Binary Interchange Format).

15. The system of claim 10, wherein the interactive television standard is OpenCable™.

16. The system of claim 10, wherein the interactive television standard is Globally Executable MHP (GEM™) standard.

17. The system of claim 10, wherein the interactive television standard is ANSI.

* * * * *